(12) United States Patent
Witzman et al.

(10) Patent No.: US 10,084,668 B2
(45) Date of Patent: Sep. 25, 2018

(54) METHOD AND SYSTEM FOR ON DEMAND ELASTIC MANAGEMENT OF DEVICES AND SERVICES

(71) Applicant: Verizon Patent and Licensing Inc., Basking Ridge, NJ (US)

(72) Inventors: Kevin R. Witzman, Colorado Springs, CO (US); Paul T. Schultz, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 677 days.

(21) Appl. No.: 14/248,502

(22) Filed: Apr. 9, 2014

(65) Prior Publication Data

US 2015/0295788 A1  Oct. 15, 2015

(51) Int. Cl.
*G06F 15/16* (2006.01)
*H04L 12/24* (2006.01)

(52) U.S. Cl.
CPC .......... *H04L 41/5051* (2013.01); *H04L 41/18* (2013.01); *H04L 41/5006* (2013.01)

(58) Field of Classification Search
CPC ....................................................... H04L 41/18
See application file for complete search history.

(56) References Cited

U.S. PATENT DOCUMENTS

| | | | | |
|---|---|---|---|---|
| 8,456,293 B1* | 6/2013 | Trundle | ............ | G08B 21/0423 340/517 |
| 8,839,317 B1* | 9/2014 | Rieger | ............... | H04N 21/2408 375/240.01 |
| 2001/0006403 A1* | 7/2001 | Crocitti | .................... | H04N 5/44 348/553 |
| 2009/0018890 A1* | 1/2009 | Werth | .................... | G06Q 10/06 705/7.14 |
| 2009/0245115 A1* | 10/2009 | Krishnaswamy | ... | H04L 41/5025 370/242 |
| 2009/0315767 A1* | 12/2009 | Scalisi | .................... | G01S 19/34 342/357.74 |
| 2011/0258320 A1* | 10/2011 | Jackson | .............. | H04L 67/1008 709/226 |
| 2012/0136992 A1* | 5/2012 | Lopez Nieto | ....... | H04L 12/1407 709/224 |
| 2013/0013473 A1* | 1/2013 | Agarwal | .............. | G06Q 20/102 705/34 |

(Continued)

*Primary Examiner* — Moustafa M Meky
*Assistant Examiner* — Sm Z Islam

(57) ABSTRACT

A method and system are disclosed that enables a customer to specify when services should be provisioned on a "just-in-time" or elastic basis. By dynamically specifying when services should be received, a customer is better able to suit such services to customer needs, thereby allowing the customer to only pay for what is actually used. Using an on-demand portal, a customer may prescribe when (or the degree to which) services should be enabled, and/or when the devices that utilize those services, or the services themselves, need to be monitored. Accordingly, the customer is given flexibility to dictate when services are required or when their services or devices require monitoring by a service provider, and the service provider is given the flexibility to tailor the amount of resources required to support and manage the customer's demands, thereby enabling more efficient use of both the customer's and service provider's resources.

20 Claims, 7 Drawing Sheets

(56) References Cited

U.S. PATENT DOCUMENTS

| | | | | |
|---|---|---|---|---|
| 2013/0132854 A1* | 5/2013 | Raleigh | ............ | G06F 3/0482 |
| | | | | 715/738 |
| 2014/0006947 A1* | 1/2014 | Garmark | ............ | H04L 65/4084 |
| | | | | 715/716 |
| 2014/0115643 A1* | 4/2014 | Meredith | ............ | H04L 65/1016 |
| | | | | 725/109 |
| 2014/0324192 A1* | 10/2014 | Baskaran | ............ | G05B 15/02 |
| | | | | 700/19 |
| 2015/0143363 A1* | 5/2015 | Gombert | ............ | G06F 9/45533 |
| | | | | 718/1 |

* cited by examiner

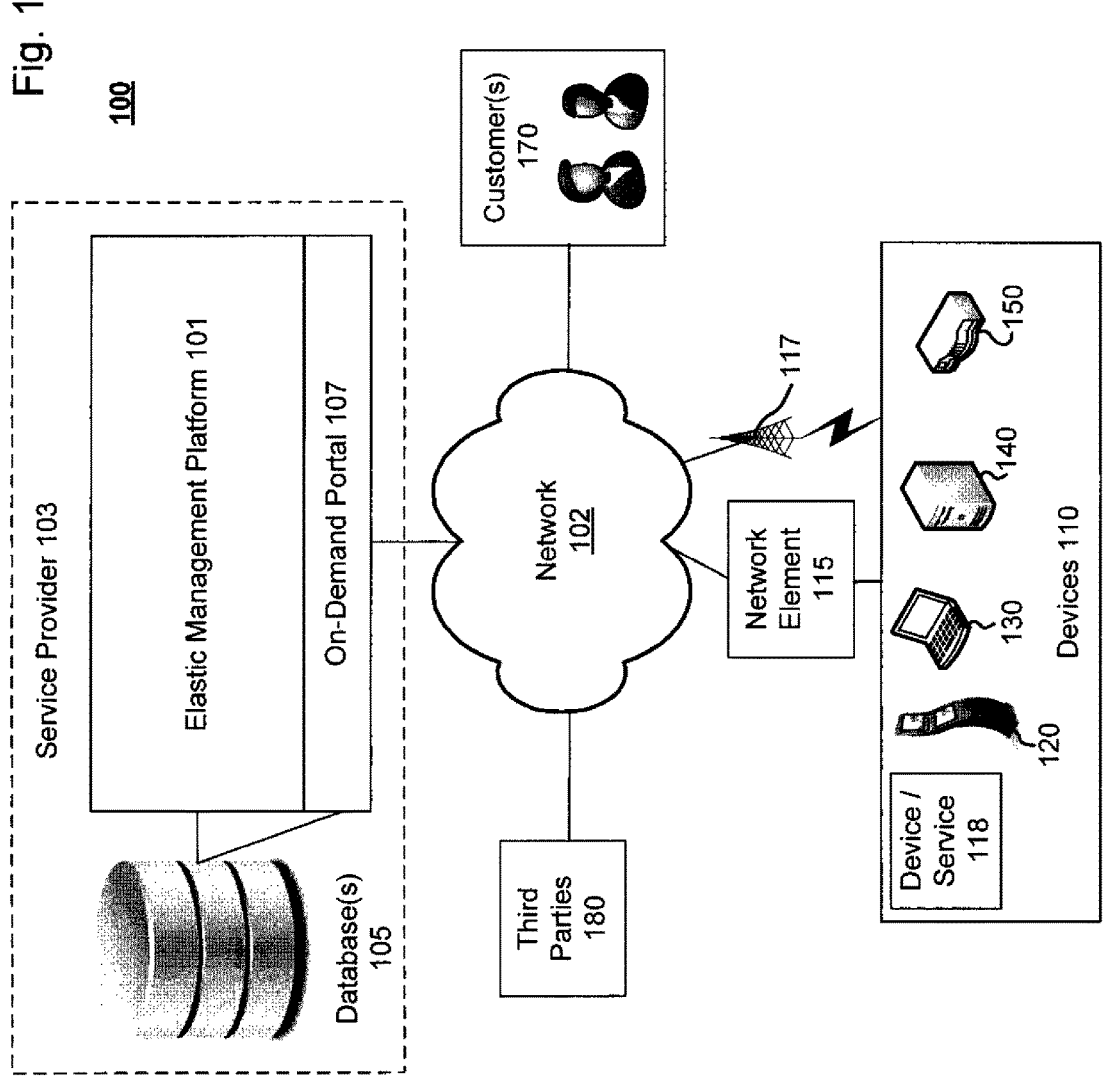

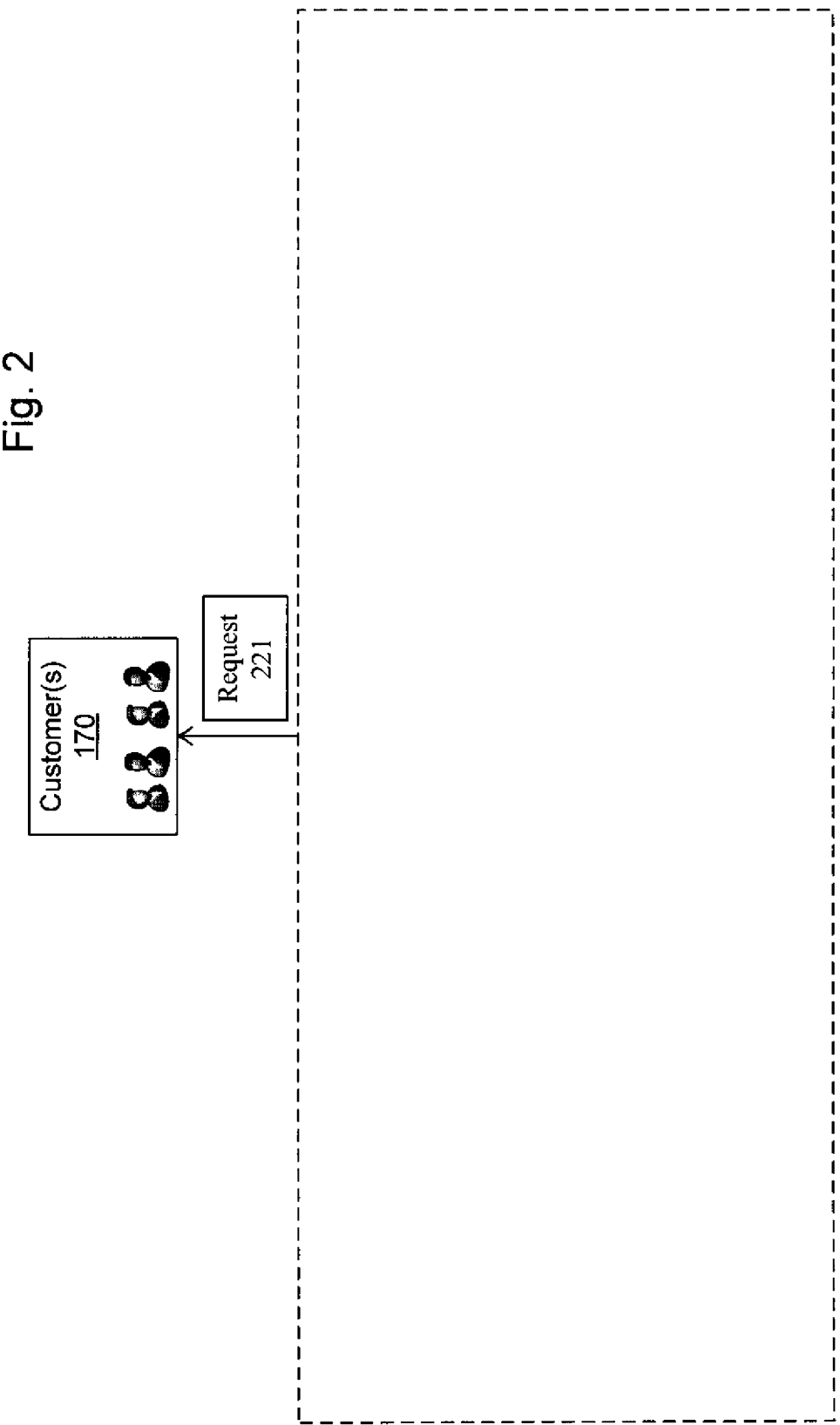

METHOD AND SYSTEM FOR ON DEMAND ELASTIC MANAGEMENT OF DEVICES AND SERVICES

BACKGROUND

A service provider is typically responsible for managing services provided to a customer on a full-time basis, i.e., 24 hours a day or 7 days a week, for example. Though the degree of management may vary, at least some service provider resources are dedicated, full time, to providing the managed service. Because of this, a customer often pays for or consumes a higher level of service than he or she needs, and the service provider often dedicates resources to manage the provided services even when such services are not necessarily being used by the customer.

BRIEF DESCRIPTION OF THE DRAWINGS

FIG. 1 depicts a block diagram of a system architecture for communications between service provider, customers, and devices; according to an exemplary embodiment;

FIG. 2 depicts a block diagram of an exemplary elastic management platform, according to an exemplary embodiment of the invention;

DETAILED DESCRIPTION

Figure 3A:
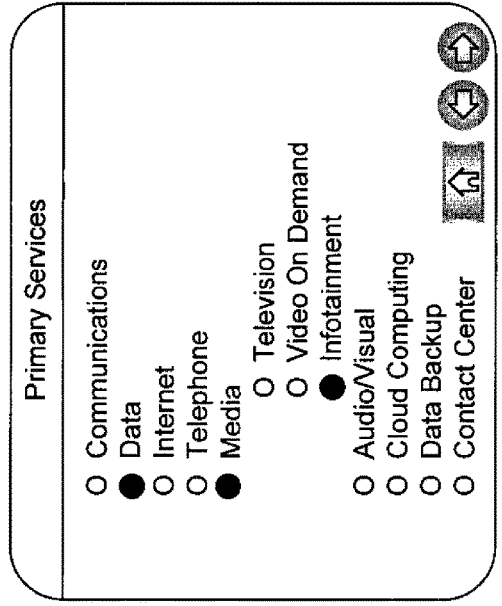
FIGS. 3A-3D depict exemplary screenshots of an on-demand portal for just-in-time selection or modification of primary services, according to an exemplary embodiment of the invention.

Reference will be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

Both the customer and the service provider stand to gain by utilizing aspects described herein. The present disclosure is directed to a system and method for provisioning services on a "just-in-time" or elastic basis. Elasticity may be thought of as changing services or monitoring of services/devices, in some cases automatically and in other cases by manual input by the customer and/or service provider, based on customer needs, thereby allowing the customer to only pay for what is actually used. More specifically, services may be enabled or disabled based on customer needs or use, such that the services are not provisioned 24 hours/day or 7 days/week, for example, particularly for services that are conventionally provisioned on a full-time basis. Aspects enable a customer to prescribe when (or the degree to which) services should be operational and/or guaranteed, and/or when (or the degree to which) the devices that utilize those services, or the services themselves, need to be monitored and operational. In one aspect, the customer is given flexibility to dictate when services are required or when their services or devices require monitoring by a service provider, and the service provider is given the flexibility to tailor the amount of resources required to support and manage the customer's demands, thereby enabling more efficient use of both the customer's and service provider's resources.

Though not limited to mobile devices or mobile services, aspects may be particularly useful with mobile devices and services. In conventional mobile services for mobile devices, such as mobile kiosks completing point-of-sale transactions, or wireless access at entertainment venues, for example, the customer and the service provider are inefficiently consuming and provisioning, respectively, the mobile services. Nevertheless, the same may be said with regard to services for stationary devices. For example, a customer may conventionally be required to purchase services for mobile or stationary devices on a monthly basis, not on an as-needed basis (such as particular hours of the day, or particular days of the week, for example). The customer is paying for and consuming a higher level of service than is needed; while the service provider is dedicating resources to maintain the provisioned level of service while such services are not being used. This underutilization by the customer and over-dedication of resources by the service provider is rampant in many types of services and management of devices, not just mobile services and mobile devices. Accordingly, aspects are useful for both mobile and stationary devices, for example.

By way of further explanation, a service provider may offer varying degrees of a managed service. In a fully-managed service, the service provider may assume full responsibility to monitor, manage and remediate the customer's devices and purchased services. Customers who select a fully-managed service option may do so to leverage the service provider's technical expertise for fault remediation and configuration management. While a fully-managed service option may be more expensive, the customer receives (or selects) a superior service level agreement (SLA) with the service provider. The SLA between service provider and customer may specify the type of services, management, monitoring, and/or remediation that the service provider will perform and/or the time constraints under which such services, management, monitoring, and/or remediation will be performed. For example, an SLA under a fully-managed service option may specify that the service provider is to provide service to, monitor, manage, and remediate the customer's devices and purchased services, and may also specify a time constraint period of 3.5 hours to repair (remediate) the devices covered, and/or the services provided, under the SLA. Another SLA under a fully-managed service option may specify the same services as above, but a time constraint period of 4-6 hours to repair (remediate) the devices covered, and/or the services provided, under the SLA.

Another type of managed service, varying from the fully-managed service described above, may include a partially-managed service. Under a partially-managed service, the service provider may provide services, monitor customer devices and/or services and notify the customer in the event of a malfunction or problem in the covered devices and/or the provided services. In this "monitor and notify" type of partially-managed service, the service provider may be responsible for proactively monitoring the customer's network by polling the covered devices (i.e., the devices under management per the SLA) every "m" (e.g., three) minutes to help ensure that such devices and services are functioning properly, and in the event of a problem, the service provider may notify the customer of the problem via an electronic notification, such as an e-mail, text message, or automated phone call, for example. An SLA under a partially-managed service may specify an "n" minute proactive outage notification requirement, under which the service provider is required to notify the customer of the problem within "n" minutes. The SLA requirements may vary for different levels of services, and may include, for example, a 15 minute, 30 minute, 1 hour, or 24 hour notification requirement. Customers who select a partially-managed service option may do so to leverage the service provider's investment in its network management infrastructure and corresponding ability to provide 7×24×365 monitoring of devices, for example. Additionally, customers selecting a partially-managed service option may wish to assume the responsibility for remediating all issues with respect to the equipment in their network (e.g., customer premise equipment), and/or to maintain change management control (e.g., both logical and physical) over devices in their network (e.g., LAN switches).

Conventionally, a partially-managed service option may be preferred for non-mission critical environments, while a fully-managed service option may be preferred for mission critical environments. In both the partially- and fully-managed service options, however, service provider resources are dedicated, full-time, to providing the respective level of service. Accordingly, the customer is paying for and consuming a higher level of service than is needed, and the service provider is dedicating resources to maintain the provisioned level of service even when such services are not necessarily being used. Therefore, a preferred and novel type of managed service is the just-in-time (or elastic) managed service option where the service provider does not necessarily provision services or dedicate resources on a full-time basis, such as 24 hours/day or 7 days/week, for example.

Under a just-in-time managed service option, a customer may manage SLAs pertaining to multiple devices and/or services, thereby enabling a wide variety of just-in-time management alternatives to suit the needs and desires of both customer and service provider. For example, a customer may select particular devices for service, management, monitoring, and/or remediation by the service provider, and may also select the particular times (including, but not limited to, scheduled times or recurring times of day, or days of week, for example) when such services, management, monitoring, and/or remediation is to occur by the service provider. The customer may switch on or off (enable/disable) particular services at-will, to suit customer needs. The customer may also manage or adjust the time constraints within the SLA, either on an individual, particularized basis, or on a recurring basis, such that the time constraint period under which the service provider is required (or contracted) to repair (or remediate) the devices covered and/or the services provided under the particular SLA may vary based on customer demand, for example. The customer may desire to monitor and remediate their devices during normal business hours, and have a service provider monitor and remediate those same devices outside of normal business hours. The customer may do this and more using an on-demand portal of an elastic management platform, discussed in more detail below. Moreover, in addition to time based methods for enabling/disabling particular services (e.g., primary or monitoring services), such enabling or disabling may be based on resource consumption or capacity. For example, a customer may specify via on-demand portal 107 that if a device/service 118 being monitored is running at less than 10% of capacity, and a problem with the device/service 118 is detected, then the relevant time constraints (e.g., the time constraint period under which the service provider is required to repair or remediate the device/service 118) may be loosened (i.e., modified) such that the service provider 103 need not repair the problem until the next business day, for example. Continuing the same example, if the device/service 118 is running at or above 75% capacity when a problem with the device/service 118 is detected, then the relevant time constraints may be modified such that the service provider 103 now needs to repair the problem with the device/service 118 in two hours or less. The customer may dynamically modify these capacity percentages at-will to suit customer needs. By utilizing aspects, the customer may more precisely specify (e.g., choose or change) the needed (or desired) services and level of service, and the service provider may more precisely dedicate the resources necessary to maintain the provisioned services and level of service, because both parties are aware of when services, monitoring, managing, and/or remediation are required, and resources need not be utilized full-time when the covered services are not being used full-time (such as 24 hours/day or 7 days/week, for example).

The description below of the exemplary elastic management platform describes modules that may include one or more servers, databases, subsystems and other components. As used herein, the term "module" may be understood to refer to non-transitory executable software, firmware, processor, hardware, and/or various combinations thereof. Modules, however, are not to be interpreted as software that is not implemented on hardware, firmware, or recorded on a tangible processor-readable or recordable storage medium (i.e., modules are not software per se). The modules are exemplary. The modules may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Referring to FIG. 1, a schematic diagram of a system 100 for enabling elastic management of devices and services is shown, according to an exemplary embodiment. As illustrated, network 102 may be communicatively coupled with one or more data transmitting devices, persons, entities, network element(s) 115, or wireless transceiver(s) 117. Various persons or entities that may exchange data through network 102 include service provider 103, customer(s) 170 of service provider 103 or another business, devices 110, and third parties 180. Service provider 103 may be responsible for managing the elastic management platform 101, on-demand portal 107, database(s) 105, and/or devices/services provided or offered to customer(s) 170. Third parties 180 may include entities that work in conjunction with service provider 103 to provide a solution or service to customer(s) 170. Moreover, the elastic management platform 101 and on-demand portal 107 may be used to manage appropriate third party 180 services as part of the management of the overall solution (i.e., primary services and/or monitoring services, for example).

Customer(s) 170 may represent current or potential customers of service provider 103 or customers of another business (particularly if service provider 103 is managing the elastic management platform 101 for another business), and may include, for example, any individual, group, entity, or agency that purchases products and/or services from service provider 103. The services (including, but not limited to, primary services and monitoring services) provided by service provider 103 may or may not relate to devices sold by service provider 103, and the devices sold by service provider 103 may or may not relate to services provided by service provider 103. Exemplary devices sold, serviced, and/or monitored by service provider 103 may include a server, a mobile device, a kiosk, a network device, router, bridge, broadband home router, cell phone, camera, copy machine, digital billboard, digital video recorder, desktop computer, hub, laptop computer, machine-to-machine gateway, media player, media server, modem, monitor, PDA, personal computer, plotter, point-of-sale device, printer, projector, scanner, sensor/actuator, set-top box, smartphone, super computer, switch, tablet computer, telephone, television, terminal, vehicle, vending machine, wearable digital device, and/or a wireless access device, for example. Although the type of device sold, serviced, or monitored by service provider 103 may be unlimited, for discussion purposes, reference will be made to device/service 118, kiosk 120, network client 130, server 140, or network device 150, for example. In the alternative, service provider 103 may be responsible for managing the elastic management platform 101 and customer(s) 170 may represent the customers of another business which provides services and/or devices to such customers.

Kiosk 120 may include an automatic teller machine (ATM), a mobile point-of-sale device, a vending machine, or other stationary or mobile device for effecting a sale or a transaction. Network client 130 may be a desktop computer, a laptop computer, a tablet computer, a sensor, a personal digital assistant, or other digital device capable of sending or receiving network signals. Server 140 may be a database server, file server, mail server, print server, web server, gaming server, application server, or a peer-to-peer networking server, for example. Network device 150 may be a router, modem, switch, hub, mobile communications device, a smartphone, a tablet computer, a wearable computer such as in the form of a wristwatch, glasses, health monitoring device, or digital bracelet, a home phone, a cellular phone, a mobile phone, a satellite phone, a personal digital assistant, a computer, a handheld multimedia device, a personal media player, a gaming device, a mobile television, or other devices capable of transmitting data and communicating directly or indirectly with network 102. The devices/products mentioned above may connect to network 102 and communicate with other network elements, servers, platforms, or providers using a wired or wireless connection, and may utilize machine-to-machine communication (including API's, client software, etc.), WiFi, 3G, 4G, 5G, LTE, Bluetooth, iBeacon, or other chipsets. Service provider 103 may provide primary services such as communication, data, Internet connectivity, media, broadcast, cloud computing, contact center, unified communications and collaborations (audio/video), security, fraud detection and management, tracking, troubleshooting, upgrade, usage reporting, repair, and/or warranty services, for example, and any associated infrastructure. Such services may be referred to as primary services and may be distinct from management/monitoring services of devices or network elements. Moreover, network element 115, kiosk 120, network client 130, server 140, and/or network device 150 may represent a plurality of network elements, service provider 103 may provide such devices and/or any related services.

The devices/products mentioned above and their related services (if any) are exemplary only. Other devices may include health care devices such as blood pressure monitors or heart rate monitors, traffic monitors, parking meters, game consoles, cameras, security systems, automation systems, lighting systems, HVAC systems, remote access systems, telematic systems, machinery, or vehicles, for example. Hereafter, the exemplary devices and/or primary services will generally be referred to as "device/service 118." Device/service 118 may be communicatively coupled directly with network 102 or via one or more intermediary devices, such as, but not limited to, transceiver 117 or network element 115. However, device/service 118 need not be communicatively coupled to network 102; rather, a customer 170 may communicate or transmit data via network 102 with other network elements and such communications or data may relate to device/service 118.

Network 102, network element 115, and/or transceiver 117 may be used by service provider 103 to provide services to customer 170 and/or exchange information within the elastic management system 100. Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Long-Term Evolution ("LTE") network, a Personal Communication Service ("PCS"), a Personal Area Network ("PAN"), a mesh network, D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, the Internet or one or more of a service provider network, a government network, a cellular network, an enterprise network, corporate network, or home network.

Data may be transmitted and received via network 102 utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. Data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

Transceiver 117 may be a repeater, a microwave antenna, a cellular tower, or another network access device capable of providing connectivity between different network mediums. Transceiver 117 may be capable of sending or receiving signals via a mobile network, a paging network, a cellular network, a satellite network or a radio network. Transceiver 117 may provide connectivity to one or more wired networks and may be capable of receiving signals on one medium such as a wired network and transmitting the received signals on a second medium, such as a wireless network.

Network element 115 may include a router, modem, customer premises equipment (CPE), a residential gateway, a machine-to-machine gateway, a server, a subscriber module, or an access point, for example. Network element 115 may be communicatively coupled with network 102 to thereby allow various devices to communicate with other network elements via network 102.

Information may be transmitted or communicated to elastic management platform 101 via network 102, transceiver 117, network element 115, and/or on-demand portal 107. For example, customer(s) 170 may transmit information to elastic management platform 101 through the on-demand portal 107.

It should be appreciated that each of the communications devices, servers, modules, or network elements may include one or more processors. One or more data storage systems (e.g., databases) may also be coupled to each of the devices or servers of the system. It should also be appreciated that software may be implemented in one or more computer processors, modules, network components, services, devices, or other similar systems.

System 100 of FIG. 1 may be implemented in a variety of ways. Architecture within system 100 may be implemented as a hardware component (e.g., as a module) within a network element. It should also be appreciated that architecture within system 100 may be implemented in computer executable software (e.g., on a tangible, non-transitory computer-readable medium). Module functionality of the architecture within system 100 may be located on a single device or distributed across a plurality of devices including one or more centralized servers and one or more mobile units or end-user devices.

The present disclosure refers to devices and services. Services associated with devices may include, but are not limited to, communication, data, Internet connectivity, media, broadcast, cloud computing, contact/call center, unified communications and collaborations (audio/video), security, fraud detection and management, troubleshooting, usage reporting, upgrade, repair, and/or warranty services, for example. As mentioned above, these types of services may be referred to as "primary services," and may be provided by service provider 103, customer 170 itself, or another party. Providing "primary services" may include providing the devices necessary for those primary services. Such devices may be provided by service provider 103, customer 170 itself, or another party. The devices or the primary services, or both, may be managed/monitored by service provider 103. The device(s) and/or primary service(s) may generally be referred to as device/service 118. The Management or monitoring of these primary services and/or devices may generally be referred to either as "management services" or "monitoring services," and may be considered distinct from primary services. Management or monitoring of the primary services and/or devices (i.e., device/service 118) may be performed by service provider 103, customer 170 itself, or another party.

A customer 170 may order (e.g., purchase or lease) a device from service provider 103 or another business, or may already be in possession of the device and wish to order services from service provider 103. The customer 170 may desire before or after ordering the device to have service provider 103 provide primary services associated with the device and/or manage the device.

Device 118 may be staged. Staging may involve preparing a device for monitoring management within the service provider's environment. Preparation may include installation of a specific software release on device 118, configuration of the installed software, configuration management, inventory management, and/or installation of a software client used to enable just-in-time or elastic management of the device 118, for example.

Device/service 118 may also be pre-configured. For example, a customer's device/service 118 may be subjected to a certification process to determine whether the device or service can be managed. Certification of a device means that the device is deemed manageable by the service provider's internal management platforms and related modules are compliant with the service provider's network transport standards and protocols. Additionally or alternatively, a management client may be installed on device 118 itself or on a related device to enable management by service provider 103. Such management client may enable interaction with the device by service provider 103. Advantageously, device 118 may be pre-provisioned (e.g., upon purchase or before shipping to customer 170) by service provider 103 to support registration and communication between the device 118 and the elastic management platform 101 and related modules. This pre-provisioning activity may enable each of the modules (e.g., order management module 202, event management module 203, asset configuration module 204, trouble management module 205, and financial management module 206, for example) to recognize the presence of a just-in-time managed device, recognize whether the device is under management, and otherwise communicate with the device for purposes of management.

After ordering and/or pre-configuring, the device/service 118 may be shipped, installed, and/or provisioned for just-in-time management. Customer 170 may be provided access to a self-service on-demand portal 107 where customer 170 can manage and/or modify the device/service 118, including configurations of the device itself, and enable/disable/modify primary services and/or monitoring services related to the device(s) on a custom basis. Service provider 103 may provide the appropriate entitlements to customer 170, which may allow customer 170 to enable, disable, and/or fine tune primary services, monitoring services, and/or configurations of the device/service 118 itself, via on-demand portal 107, based the customer's service needs. Such enabling/disabling or modification may be sent as a request 221 to elastic management platform 101 from customer 170 via portal 107. On-demand portal 107 may include various channels accessible by customer 170, including a website on the Internet, an application on a mobile device of customer 170, or a communication link or management client on device 118 itself. Portal 107 may also include a contact center of service provider 103 (e.g., where customer 170 can contact a representative of service provider 103), a retail store of service provider 103, live chat, and/or another computing device where customer 170 may communicate with service provider 103 or transmit information to/from elastic management platform 101, for example. Elastic management platform 101 may comprise an input module 207 and an output module 208 for communicating with on-demand portal 107, customer 170, device/service 118, and/or database(s) 105, for example.

Various data may be stored in database(s) 105 for the purpose of aiding in the provision of service and/or management of devices/services 118, and this data may include information about customer(s) 170, devices/services 118, corresponding IDs, a customer's or device's service history, service plans, and locations of customer(s) 170 or devices associated with customer(s) 170, for example. Customers 170 may have a designated customer type, such as an individual, business, or government designation. Customer type may also include the size of customer 170. Various data may also be recorded for each device/service 118 and such data may be automatically retrieved by various modules of the elastic management platform 101, such as the asset configuration management module 204 or the order management module 202. Content of request 221 (including metadata) may be analyzed to determine which customer 170 and devices/services 118 are implicated in the request. Metadata, in the request 221 itself, may be read to determine a customer or device/service 118 ID. Details about customer 170 or details about device/service 118 may be input directly by customer 170 into the portal 107, or retrieved by order management module 202 using a customer ID associated with customer 170, for example. Upon receiving a customer ID, details of the devices and/or services associated with customer 170 may be retrieved by the order management module 202, and such information may be conveyed to other modules of elastic management platform 101. Such retrieved data may include a customer's or device's service history, service plans, and locations of customer(s) 170 or devices associated with customer(s) 170, for example.

A customer's or device's service history may represent previous services provided to customer 170, and may or may not relate to troubleshooting efforts with respect to device/service 118 associated with customer 170. A service plan may represent the particular services that customer 170 is currently or was previously receiving. The service plan may or may not be associated with a device provided by service provider 103. Locations of customer(s) 170 or devices associated with customer(s) 170 may also be stored in database 105. Location data may be in the form of latitude and longitude coordinates, zip code, city/state, or street address, for example. Such data may be informative of the devices/services 118 which are available to customer 170, and/or may provide clues as to how to resolve a problem detected with respect to devices/services 118 while monitoring such devices/services 118.

A central feature of embodiments of the present invention pertains to the dynamism of the service level agreement or SLA. SLA 302 may represent one or more service level agreements between service provider 103 and customer 170. The SLA may be frequently updated or modified (e.g., daily or weekly) by customer 170 on a just-in-time or as-needed basis. The service level agreement 302 may specify what primary services should be provided, whether management should occur, the type and/or degree of management, and time parameters associated with the management, for example. Customer 170 may be permitted to enable/disable/adjust each of these components of SLA 302 via on-demand portal 107, thereby making SLA 302 between customer 170 and service provider 103 very dynamic. With regard to enabling primary services, on-demand portal 107 may allow a customer to choose whether primary services should be enabled/disabled, the type of primary services, the degree of those services, time parameters associated with those services, and modifications of those services, for example.

By way of example, customer 170 may specify via on-demand portal that customer 170 desires service provider 103 to provide communication, data, and Internet connectivity for kiosks owned or leased by customer 170. For example, a customer 170 may have ten kiosks 120 that it wishes to deploy during a local event, such as a state fair. A goal of customer 170 may be to sell merchandise or services to attendees of the event. To accomplish this goal, customer 170 may have opted to use kiosks 120, for example, as point-of-sale devices at various locations of the event, which kiosks 120 may have been purchased or leased from service provider 103 or from another business. Kiosks 120 may have been pre-provisioned for management by service provider 103 before delivery to customer 170. Alternatively, kiosks may be provisioned for service by service provider 103 after delivery to customer 170. In any case, in the present example, customer 170 desires to have service provider 103 provide communication, data, and Internet services for the kiosks 120 during the event. Such communication and data services may be termed the primary services associated with device 118 (e.g., kiosks 120). Other services may be provided and other devices may be used. Accordingly, customer 170 may submit a request 221 via portal 107 to elastic management platform 101 to have service provider 103 provide communication, data, and Internet services, for example, to the kiosks 120. Customer 170 may specify the particular days and even times of day that the primary services (e.g., communication, data, and Internet services) should be provided, and for which particular devices (e.g., the ten kiosks 120).

Customer 170 may also specify via portal 107 whether management should occur for particular devices/services 118. For example, customer 170 may also desire to have service provider 103 manage the ten kiosks 120 during the event to ensure that the kiosks 120 are functional and that the primary services are appropriately being delivered. Accordingly, customer 170 may submit a request 221 (which may be the same request as above) via portal 107 to elastic management platform 101 to have service provider 103 manage the kiosks 120.

Customer 170 may specify, via portal 107, the desired type of management. "Management" may refer to monitoring and/or remediation services by service provider 103. Accordingly, customer 170 may specify, for example, that it wants service provider 103 to both monitor and remediate kiosks 120. "Monitoring" may comprise auditing, checking, controlling, observing, notifying, scanning, supervising, or tracking, for example. In the present example, monitoring may refer to service provider 103 proactively monitoring the network(s) used by kiosks 120 (such as LAN, WAN, and/or cellular, for example) by polling the covered devices every "m" minutes to help ensure that such devices are functioning properly. If a problem arises, "monitoring" may also include notifying customer 170 of the problem, providing details of the problem, and/or informing of steps to remediate the problem. Such notification may be in the form of an electronic notification to customer 170, such as an e-mail, text message, and/or automated phone call, for example, to one or more designated persons, addresses, or devices.

"Remediate" may comprise answering, calculating, deciphering, determining, explaining, fixing, handling, mending, resolving, and/or solving the problem, for example. In the present example, remediating may refer to service provider 103 resolving any problems that arise with kiosks 120 with respect to the provided primary services (in this example, communication, data, and Internet services). The desired type of management may be specified via portal 107 and may be included in request 221.

Customer 170 may also specify, via portal 107, the degree of management. For example, customer 170 may specify that it wants nine of the ten kiosks 120 fully functional at all times. Additionally, customer 170 may specify that it wants the kiosks 120 polled, audited, or checked, for example, every 15 minutes. The degree of management may be specified via portal 107 using, for example, text entry, virtual knobs, or radio buttons. The desired degree of management may be specified via portal 107 and may be included in request 221.

Customer 170 may also specify, via portal 107, time parameters associated with the management. Time parameters may comprise the times during which customer 170 wants service provider 103 to provide primary services, manage the device/service 118, and/or time constraints for such management. For example, customer 170 may specify that it wants service provider 103 to provide primary services and to manage kiosks 120 from 10:00 AM-11:00 PM, Thursday, March 13 thru Monday March 17, because such times correspond to the operating hours of the local event at which the kiosks 120 will be deployed, for example. Customer 170 may also specify that it wants any problems with kiosks 120 remediated in six hours or less, and may accordingly specify a time constraint period of six hours. Time parameters associated with the management of devices/services 118 may be specified via portal 107 using, for example, virtual knobs, clocks, and/or calendars. The desired time parameters may be specified via portal 107 and may be included in request 221.

In addition to scheduling in advance, the primary services and/or management/monitoring services may be readily modified by customer 170 via portal 107. For example, a need may arise where customer 170 needs additional primary services and/or monitoring of devices/services 118. Accordingly, customer 170 may log in to portal 107 and enable those services on an as-needed, i.e., just-in-time, basis. Alternatively, customer 170 may realize that particular services, e.g., monitoring services, will not be needed for a period of time due to a temporary change in business conditions, for example. Accordingly, customer 170 may login to portal 107 and disable those services at-will, thereby reducing the cost customer 170 would otherwise need to pay for receipt of those monitoring services, and service provider 103 may more appropriately tailor its resources (including staff, bandwidth, and equipment, for example) to serve its customers.

Naturally, the cost of primary services and management will be proportional to the type, degree, and time parameters (which may include duration of services, amount of notice to service provider 103 to provision those services, and/or time within which service provider 103 must remediate problems with those services, for example) of the primary services and management chosen by customer 170. Elastic management platform 101 may provide a cost estimate to customer 170 which may change as customer 170 chooses the type, degree, and time parameters associated with the primary services and/or management. The above features will be described in further detail by referring to the on-demand portal 107 and the various modules of the elastic management module 101.

Referring to FIG. 2, a diagram of an exemplary elastic management platform 101 is shown, according to an exemplary embodiment. The elastic management platform 101 may be said to comprise the on-demand portal 107. Customer 170 may submit a request 221 to the elastic management platform 101 through portal 107. Portal 107 may be accessed through various channels, including, but not limited to, the representative channels shown in FIG. 2, namely, web, mobile device, or the device itself, such as kiosk 120, for example.

Elastic management platform 101 may comprise a number of modules that allow service provider 103 to effectively manage and provide services to customer 170. For example, elastic management platform 101 may comprise an order management module 202, events management module 203, asset configuration management module 204, trouble management module 205, and financial management module 206, for example. Each of these exemplary modules will be explained in further detail below.

Asset configuration management module 204 may be responsible for determining whether device 118 is configured for service and management by service provider 103. If device 118 is pre-configured for service and/or management before customer 170 receives or uses the device 118, then such information may be stored in asset configuration management module 204, or in database 105. Alternatively, if device 118 is configured for service and/or management after customer 170 has received device 118, then such information may be stored or updated in asset configuration management module 204, or in database 105, including any details of the configuration or actions taken to perform the configuration.

Asset configuration management module 204 may relay information to portal 107 as to which devices are configured for service and/or management. Such information may allow portal 107 to display particular devices (e.g., device IDs and/or icons) to customer 170 when customer 170 is selecting which devices to have serviced/managed. In addition to keeping track of which devices have been (pre-)configured for service and/or management, asset configuration management module 204 may work in conjunction with monitoring module 203 to keep track of which devices remain configured for service and/or management. If monitoring module 203 detects that device configurations have been changed (e.g., by customer 170, service provider 103, or another party), either during or outside of management of the device 118, then asset configuration management module 204 may record such changes of the device configurations (for example, in database 105), and may also make a determination of whether such changes impact whether device 118 can be managed in the future. Alternatively, if customer 170 decides to take a device 118 out of service and/or management (i.e., to no longer be serviced and/or managed by service provider 103), then a future request 221 to have device 118 serviced or managed may necessarily include a request to re-verify the configurations of device 118 to determine whether device 118 can be serviced/managed again in response to the request 221. Upon receipt of a request 221 to have a device 118 serviced and/or managed, asset configuration management module 204 may utilize a script to verify the configuration (including connectivity) of device 118. An exemplary script comprises a program that verifies connectivity to a device (through a "ping test," for example), then compares and contrasts the parameters/configuration of the device in question with the parameters/configuration of an agreed standard. The results of this comparison would determine the manageability of the device. Another exemplary script may include a series of commands to device 118 to initiate self-test(s) and then report results of these self-test(s) to Elastic Management Platform 101. Once the connectivity and/or configuration of device 118 has been verified by asset configuration management module 204, customer 170 may select device 118 for service and/or management via portal 107.

As explained above, customer 170 may submit a request 221 via portal 107 to enable/disable/modify service and/or management of a device/service 118. With regard to management of device/service 118, enabling management of device/service 118 allows the elastic management platform 101 to automatically and routinely communicate with the device being managed by service provider 103. Order management module 202 may receive request 221 via input module 207. Order management module 202 may also submit a response to customer 170 from service provider 103 indicating whether service provider agrees to the specified terms in request 221. Alternatively, forms on portal 107 used for submitting request 221 may only include terms to which the service provider 103 will agree (in association with the cost presented to customer 170 via portal 107). In such a case, a response from service provider 103 would be unnecessary because the request 221 will be accepted upon submission (and hence approval of the cost) by customer 170. Service provider 103 may require various terms such as a lead time before provision of services and/or management of device/service 118 is to begin (e.g., 24 hours). Other terms may be "negotiated" by the price charged.

Order management module 202 may keep records of which devices 118 are requested to be serviced/managed, which devices 118 are actively being serviced/managed, and corresponding details about the devices 118 (e.g., type, location, configuration) and the level of service/management (e.g., type, degree, and time parameters associated with the service/management). Such records may be included in or appended to SLAs associated with the various customers 170 submitting the requests 221. Such records may allow the elastic management platform 101 to appropriately perform service/management and triage any problems that may arise during service/management of the various devices 118. For example, service provider 103 may precisely assign additional or fewer resources for servicing/managing devices 118 depending on the number and type of requests 221 received. In this manner, service provider 103 may preserve resources and the cost to customer 170 will be lower.

Order management module 202 may also be used for pattern recognition and machine learning to learn how customer 170 will enable/disable/modify settings for primary services and/or monitoring services. Alternatively, device behavior itself may also be monitored to identify usage patterns that may trigger elastic management. Order management module 202 may detect patterns based on previous requests 221 submitted by customer 170. Patterns may relate to the type(s) of services requested, the location from which the request is sent, and/or the device from which the request is sent, for example. By monitoring the IP address or device ID, for example, of the computer from which requests 221 are received, order management module may be better able to determine whether the request 221 is really coming from customer 170. Accordingly, pattern recognition may be used in a security/authentication context.

Moreover, once a pattern is detected, service provider 103 may anticipate when and what type of services will be needed by customer 170, and in such manner the service provider 103 may more efficiently utilize its own resources for provisioning of services to its customers (such as increasing the amount of resources available at anticipated times). Moreover, detected patterns may also be used to prompt customers 170 about upcoming requirements for services. For example, a pattern may be detected where customer 170 requests particular services the last three weeks of every quarter, or over a particular holiday every year, or during a particular event that occurs around the same time every year. Service provider 103 may use this detected pattern to prompt customer 170 to enable the anticipated services via portal 107 before the anticipated time, or may even offer a price discount to customer 170 if customer 170 registers for the anticipated services before a particular date. Service provider 103 may offer additional, related services to the anticipated services in a prompt to customer 170. Prompts to customers may be in the form of email, text message, phone calls, mailings, or other notifications to customer 170. In such manner, service provider 103 may build loyalty with customer 170, and may be able to ensure business by being the first service provider 103 to ask whether customer 170 requires the anticipated services, and may be able to contract for additional service by offering additional, related services to customer 170, based on detected request patterns for customer 170.

Additionally, service provider 103 may reach out to additional entities upon detecting a pattern of a particular customer 170, or upon receiving a request 221 from a particular customer. For example, customer 170 may request data and security services for various devices to be provisioned at a particular location, such as a stadium. Based on this request, and possibly other requests, service provider 103 may recognize that a large event is going to take place at the stadium at time "T." Based on this information, service provider 103 may anticipate "knock-on" effects, such as other entities that may attend the event at the stadium, or other entities that may need services during such time. For example, service provider 103 may anticipate that several vendors will likely attend the event, and may even anticipate which vendors will attend. Service provider 103 may reach out to these vendors to offer services (such as communication, data, security, or infotainment services, for example) to such vendors. By doing so, service provider 103 may lock-in services with those vendors before the vendors contract with other service providers to provide the same or similar services. Further, service provider 103 may anticipate that the event will impact various infrastructure surrounding the event, such as communications, traffic, or city infrastructure, for example. Accordingly, service provider 103 attempt to contact relevant entities to determine whether such entities would like additional monitoring services during this time, such as monitoring traffic signals, for example. By anticipating knock-on effects after receiving one or more requests for services, service provider 103 may lock-in additional business opportunities, particularly with entities who have yet to contract for primary or monitoring services relevant to the original one or more request received by service provider 103.

By way of a separate example, customer 170 may desire that its communication services offered by service provider 103 and any associated equipment (which may or may not be provided by service provider 103) be monitored only during normal business hours for the customer, rather than 24 hours a day 7 days a week. The communication services and associated equipment may be used in a call center run by the customer 170, which call center is open from 8:00 AM to 6:30 PM, Monday thru Friday. Customer 170 may specify, via the customer portal 107, which services and which equipment should be monitored by service provider 103. As such, customer 170 would not need to pay for and consume a higher level of service than needed and the service provider 103 would not need to dedicate resources to maintain the provisioned level of service while such services are not being used (e.g., from 6:30 PM to 8:00 AM). In other words, customer 170 would not need to pay for, and service provider 103 would not need to provide, primary and/or monitoring services 24 hours a day, 7 days a week.

By way of further example, customer 170 may desire to have a call center open 24 hours/day, as opposed to only from 8:00 AM to 6:30 PM. Customer 170 may wish to run the call center itself (e.g., use its own employees) from 8:00 AM to 6:30 PM (e.g., day shift), and have service provider 103 monitor the communication services required to run the call center and any associated devices during that time. Customer 170 may also desire to have service provider 103 itself run the call center from 6:30 PM to 8:00 AM (e.g., evening shift) in addition to monitoring the communication services and the associated devices during that time. The specific times, type of services and/or management, and the particular devices to be managed, may all be specified by customer 170 via portal 107.

In an alternative embodiment, customer 170 may wish to have high data (e.g., upload/download/transmission) speeds provided at its premises, or at particular devices, during normal business hours (e.g., 8:00 AM-6:00 PM), but may not require high data speeds outside of normal business hours. Accordingly, customer 170 may specify, via portal 107, which primary services are to be utilized, the degree of those primary services (which degree may vary throughout the day or week, for example), and any time parameters associated with those primary services.

Monitoring module 203 may be responsible for monitoring devices/services 118 under management. As mentioned above, monitoring module 203 may monitor devices 118 to detect whether device configurations are changed (e.g., by customer 170, service provider 103, or another party), either during or outside of management of the device 118, or both, and monitoring module 203 may then convey that information to other modules, such as asset configuration management module 204. Also, monitoring module 203 may track device location, device and network information (e.g., device ID, MSISDN, MEID, MAC address, IP address, port(s)) and update any changes in database 105, for example. Such information may be used to assist in the provision of services and/or management of device/service 118.

Monitoring the location of a device 118 may be useful in a number of different aspects. For example, customer 170 may set up a "geo-fence" for a device 118 and desire that device 118 remain within that geo-fence. The geo-fence may represent a geographical area. For example, customer 170 may own large and expensive equipment, such as earth moving equipment. Such equipment itself may be considered device 118 or an electronic device on such equipment may be considered device 118. Customer 170 may set up a geo-fence for such equipment and request service provider 103 to monitor the location of such equipment and also monitor the status of the particular device that emits the location of such equipment. Customer 170 may desire to be alerted if the equipment transcends the pre-determined geo-fence or if the location-emitting device on the equipment malfunctions. As another example, a device may be pre-provisioned for management when the device arrives at, or is located in, a particular area. For example, customer 170 may desire that device 118 be managed when device 118 physically reaches a facility of customer 170 or the location of an event at which device 118 will be used. Service provider 103 may monitor the location of device 118, but not "fully manage" or "fully service" the device according to the type, degree, and time parameters specified in a request 221, until device 118 reaches the specified location/area. Once the device reaches the specified area, the requested services (e.g., primary and/or additional monitoring services) may begin.

The degree of service or management may vary based on time, location, and/or status of device 118 (or a person associated with device 118), and the variable degrees of management may be specified by customer 170 using portal 107. For example, if device 118 is an airplane, the device may be monitored very heavily when it is airborne and monitored less heavily after a successful landing. Device 118 may be a health monitoring device and monitoring may pertain to the device itself or a person connected to or wearing the device. If the device (e.g., person wearing device) is at a particular location (e.g., home), the degree of monitoring may be low (as specified, for example, by customer 170). But if the device (e.g., person wearing device) is away from the particular location (e.g., home), then the degree of monitoring may increase (as specified by customer 170, for example). Monitoring locations may be useful in a shipping context, where cargo or packages may be tracked until delivery at a specified location, for example.

With further reference to FIG. 2, trouble management module 205 may be responsible for generating tickets upon detection of a problem or receipt of a report of a problem. Monitoring module 203 may detect a "problem" or "event" during monitoring device/service 118. The types of problems or events that may prompt a ticket are innumerable, but examples may include monitoring module 203 detecting that a device has malfunctioned, a sensor has recorded a measurement that surpasses a threshold, two or more instances of raw data for the same device differ widely, a device has exceeded or breached a geo-fence, data speeds (e.g., upload/download/transmission) have crossed a threshold, a network device is in a down state, communication services have halted, receipt/transmission of data has halted, the amount of data reserves (e.g., in a database) has crossed a threshold, a camera or motion detector detects motion, a software update is released, a data breach has occurred, exceeding capacity thresholds (e.g., CPU utilization, bandwidth usage, queue depths, service timeouts), unauthorized use (e.g., security breaches), public service announcements that drive the need for increased capacity (e.g., storm warning, hurricane warning, safety warning), or commercial announcements (e.g., concert tour announcement, reality TV voting outcomes), for example. Thresholds may be set by service provider 103 and/or customer 170.

Alternatively, trouble management module 205 may receive report of a problem or event directly from customer 170 via portal 107, for example. If customer 170 itself reports a problem/event with a particular device/service 118, trouble management module 205 may determine whether device/service 118 is actively being serviced/managed (i.e., whether customer 170 previously requested that service provider 103 actively service/manage device/service 118). If customer 170 has enabled a device for full management and a trouble ticket is opened, the ticket may follow a routine trouble management process. However, if a ticket is opened against a device that is not actively being serviced/managed, the priority of that device may be appropriately throttled to account for the reduced SLA due to the device not being enabled for service/management.

A routine trouble management process may comprise generation of a trouble ticket, generation of a service request, delivery of the service request, and follow-up procedures. For example, if monitoring module 203 detects a "problem" or "event" during monitoring device/service 118, a trouble ticket may be generated. The trouble ticket may specify the device/service 118 involved, configuration data of the device/service 118, location data of device/service 118, potential impacts resulting from the "problem" or "event" (e.g., users are unable to purchase merchandise from a kiosk), data about customer 170 who requested service/management of device/service 118, and data (e.g., sensor data) that prompted detection of the problem or event. Next, a service request may be generated based on data in the trouble ticket. For example, depending on the nature of the problem or event, the relevant individuals or team(s) may be provided with a service request. The service request may comprise, for example, the trouble ticket and details of the SLA (e.g., time constraints) associated with customer 170 and device/service 118 that is the subject of the trouble ticket. The service request may further comprise the details of the services, resources, or configurations required to support the increased (or decreased) service level.

With further reference to FIG. 2, financial management module 206 may be responsible for providing a cost or cost estimate to customer 170 via portal 107. For example, while customer 170 is choosing whether primary services should be provided or whether management should occur, which devices should be managed, the type and degree of service/management, and time parameters associated with the primary services and/or management, financial management module 206 may output a cost or estimated costs (hereafter "cost") for those primary services and/or management services. The cost may be a one-time cost, an hourly/daily/weekly/monthly/yearly cost, or a total cost, for example. Typically, the cost will vary based on the options chosen by customer 170. As shown in FIGS. 3C-4D, for example, as customer 170 chooses various options via portal 107, a cost may be displayed. Alternatively, a cost may be displayed for each of the various options before customer 170 selects the various options.

FIGS. 3A-3D and 4A-4E show exemplary screenshots of portal 107 viewable by customer 170 on the web, a mobile device, or on device 118, for example. Via portal 107, customer 170 may log in to their account, view bills or statements, view status of devices/services 118 registered with their account (e.g., whether the devices/services 118 are active or not), open a trouble ticket associated with device/service 118, view device/service configurations, open a change request (e.g., to change configurations of device/service 118, to upgrade, and/or to move a device/service 118 from one location to another, for example), submit a request 221 for services and/or management of device 118, adjust or view a service level agreement 302, agree to terms and conditions associated with service/management of device/service 118, change customer options, adjust notification settings, and/or purchase or lease new devices, for example.

By way of example, and with reference to FIGS. 3A-3D, customer 170 may wish to purchase primary services and monitoring (or management) services for an upcoming event at a convention center. Customer 170 may be sponsoring a booth where the customer will sell merchandise related to the event taking place at the convention center. For example, the event may be a car show, and customer 170 may wish to sell its magazine entitled "Vehicle Enthusiast" to attendees of the car show. Accordingly, customer 170 may wish to have one or more network devices 130 (e.g., a tablet computer) as a point-of-sale device where attendees can sign up for Vehicle Enthusiast magazine. Customer 170 may also wish to have some "infotainment" programming playing at the booth. The programming may be provided by customer 170 or another entity, and may relate to the merchandise that customer 170 is selling, or more generally, to the event taking place at the convention center, for example. Customer 170 may wish to display this infotainment on one or more kiosks 120. Customer 170 may also wish service provider 103 to monitor the primary services and the one or more network devices 130 and kiosks 120 to ensure that the services and devices function properly for the duration of the event, or at least during operating hours of the event.

Figure 3B:
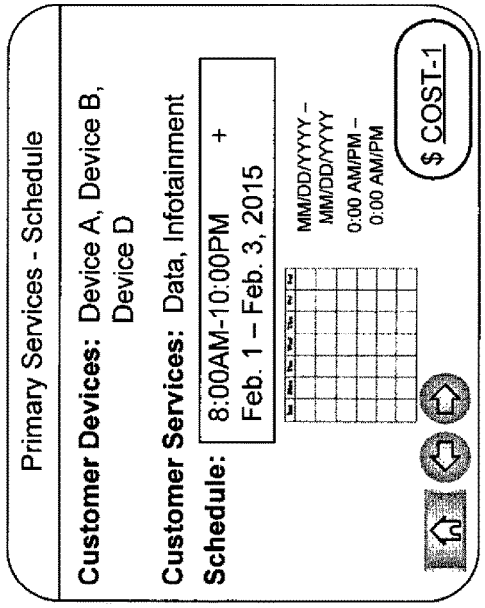
Figure 3C:
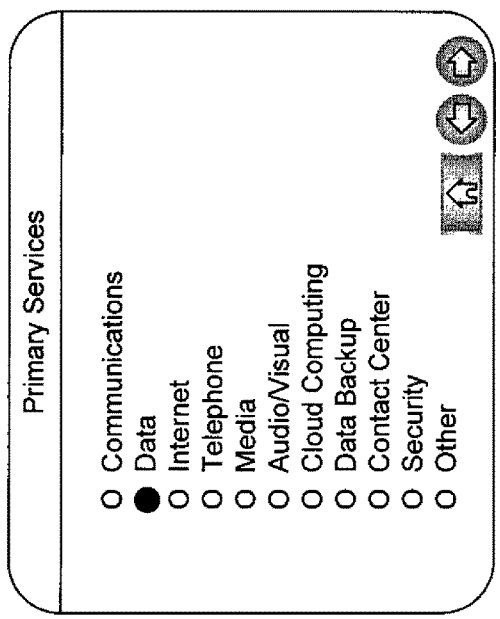

To purchase these primary services and corresponding monitoring services, customer 170 may log in to portal 107 and navigate to a "Primary Services" page where customer 170 may choose which primary services to purchase. Primary services may be organized by type of primary services and/or customer devices 118 previously registered with service provider 103. Asset configuration module 204 may display a list of devices 118 that are configured for service/monitoring by service provider 103. Alternatively, devices 118 may be registered or manually entered by customer 170 when electing to purchase primary services or monitoring services. Manual entry of devices 118 may comprise a registration process of devices 118 and may enable service provider 103 to connect to devices 118. FIG. 3A shows a list of exemplary primary services that customer 170 may select. By way of example, customer 170 may wish to have two tablet computers and one kiosk at the booth. For the two tablet computers 130, customer 170 may select "Data" services, as shown in FIG. 3A, which may permit attendees to transmit and receive data using the tablet computers, for the purpose of signing up for the Vehicle Enthusiast magazine. Customer 170 may also select "Media" services for the kiosk 120. Upon selection of a general primary service, such as "Media," additional or more specific primary services may be displayed, as shown in FIG. 3B, for example. Customer 170 may wish to provide infotainment media to attendees of the event via kiosk 120, and may accordingly select "Infotainment," as shown in FIG. 3B. A list of available devices that may use such primary services may be displayed upon selection of each of the primary services, or on a subsequent page as customer 170 continues to navigate through portal 107. Forward, backward, home, and submit softkeys, for example, may be provided at various pages while navigating through portal 107. After selecting the desired primary services, customer 170 may advance by pressing a right arrow softkey, for example.

At the next exemplary screen, customer 170 may select which devices are to receive the primary services. Devices "A" thru "N" may represent any number of devices that customer 170 either currently owns/leases, or that may be available for purchase/lease. Various devices, such as "Device E," that are not properly configured, may stand out from the rest (grayed out, for example) and may have an icon next to such device to link to more information. "Device E," for example, may be owned by customer 170, but may not be currently configured for service/monitoring by service provider 103. Accordingly, "Device E" may stand out from the rest (by a different font, color, or symbol, for example). "Device A" and other device designations may represent a collection of similar devices or, alternatively, individual devices. For example, "Device A" may represent all tablet computers owned/leased by customer 170, and upon selection of "Device A," a list of all such tablet computers may be displayed to allow more particular selection of individual tablet computers. By way of example, "Device A" and "Device B" represent two tablet computers, for which customer 170 wishes to purchase data services. Customer 170 may select these two devices, upon which a "COST" may be displayed on the screen. Alternatively, a cost may be displayed next to each device to further aid customer 170 in selecting which devices 118 to purchase services for (or which devices to purchase in conjunction with services). The cost may change upon selection of one or more other devices or options. "COST" may be based on a default provisioning time period (e.g., 1 day, 1 week, or 1 month) for the primary services. This time period may be selected with more specificity (e.g., a designated schedule) or may vary according to customer needs, in that the customer may enable/disable the services on-demand. Additional information on the cost may be provided by selecting a symbol near the cost, such as the "▶" symbol, for example. Alternatively, "COST" itself may be a hyperlink, upon selection of which a pop-up or another page may be displayed providing additional information on the cost. In this exemplary manner, customer 170 may choose which tablet computers should receive data services for the event. Customer 170 may go through the same process for selecting which devices (e.g., kiosk 120) should receive "infotainment" services. The "COST" may be updated upon each selection by customer 170. Customer 170 may proceed by pressing the right arrow softkey, for example.

Figure 3D:
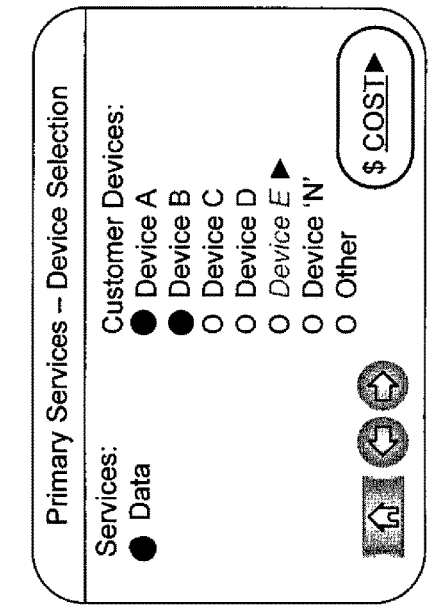

Customer 170 may specify the particular time parameters for provisioning of the primary services. Of course, these time parameters may be preliminary and the customer may elastically modify them at-will, via the on-demand portal 107. For example, the event (e.g., car show) may take place from February 1-February 3, and customer 170 may only wish to purchase the primary services for the particular devices for this period of time. Further specificity may be selected, such as the times of day, for example, for provisioning of the primary services. As shown in FIG. 3D, the previously-selected primary services and devices may be listed, and customer 170 may enter time parameters associated with the primary services. For example, customer 170 may enter Feb. 1, 2015-Feb. 3, 2015, 8:00 AM-10:00 PM, which times may correspond to the operating hours of the local event at which the tablet computers and kiosk 120 will be deployed, for example. Additional, out-of-sequence times may be entered by selecting the "+" softkey, for example. Dates may also be selected using a calendar or a custom entry portion (e.g., "MM/DD/YYYY-MM/DD/YYYY 0:00 AM/PM-0:00 AM/PM"), as shown in FIG. 3D. Upon entry of the primary services time parameters, the cost may be updated (as reflected by "COST-1"), for example.

Figure 4A:
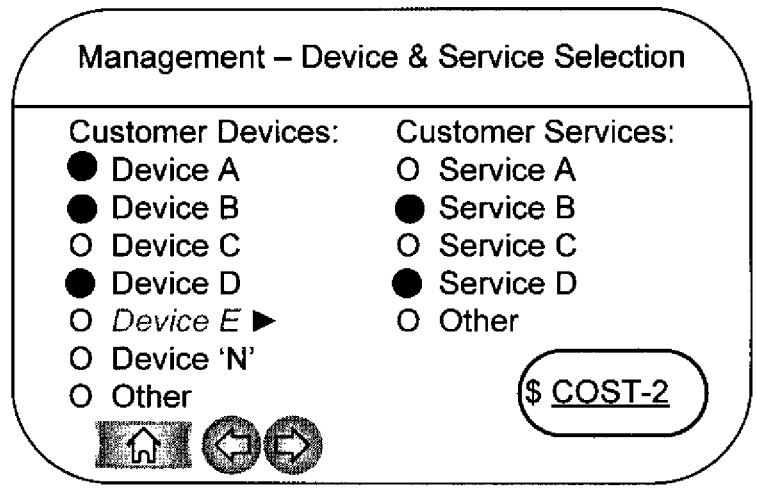
FIGS. 4A-4E depict exemplary screenshots of an on-demand portal for just-in-time selection or modification of monitoring options for devices or services, according to an exemplary embodiment of the invention.
Figure 4B:
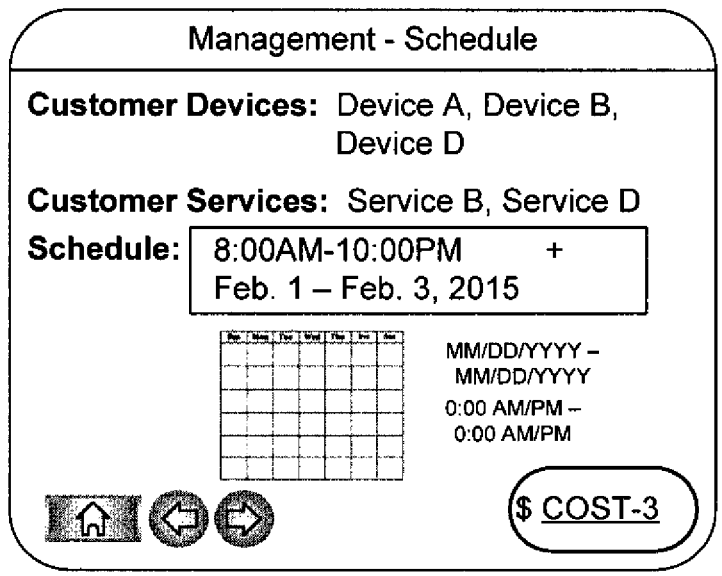

Customer 170 may also specify via portal 107 whether management/monitoring should occur for particular devices/services 118. For example, as mentioned above, customer 170 may also desire to have service provider 103 manage the tablet computers 130 and kiosk 120 during the event to ensure that the devices are functional and that the primary services are appropriately being delivered. Accordingly, customer 170 navigates to a "Monitoring" or management portion of portal 107. Alternatively, customer 170 may skip directly to the management portion of portal 107 if customer 170 is already receiving primary services or there are no related primary services offered by service provider 103, for example. After indicating a desire to have service provider 103 monitor particular devices and/or services, customer 170 may be directed to a page where customer 170 may select which particular devices or services should be monitored. For example, as shown in FIG. 4A, various devices and services may be presented to customer 170 for selection. Devices/services 118 previously selected may be pre-selected, as shown in FIG. 4A. "Device A" and "Device B" may represent the tablet computers, and "Device D" may represent the kiosk, for example. "Service B" may represent data services for the tablet computers and "Service D" may represent infotainment services for the kiosk, for example. Upon selection (or pre-selection), customer 170 may be presented with a price "COST-2" to monitor the selected devices/services 118. "COST-2" may represent the cost in addition to "COST-1" for purchasing primary services, shown in FIG. 3D. Alternatively, "COST-2" may represent a total cost based on selections made on the current and previous screens. Customer 170 may proceed by pressing the right arrow softkey, for example.

Customer 170 may also specify, via portal 107, time parameters associated with the management/monitoring. Time parameters may comprise the times during which customer 170 wants service provider 103 to manage/monitor the devices/services 118, and/or time constraints for such management. Of course, these time parameters may be preliminary and the customer may elastically modify them at-will, via the on-demand portal 107. For example, customer 170 may specify that it wants service provider 103 to manage the tablet computers and kiosk 120 during the time that service provider 103 is scheduled to provide primary services to these devices, e.g., from 8:00 AM-10:00 PM, February 1 thru February 3, or may specify other times for management of these devices. These time parameters may be very specific and are preferably more precise than default or conventional time periods, such as monthly installments. Time parameters may be modified by customer 170 simply by logging in to on-demand portal 107, where enabling/disabling or modifying a schedule for receipt of services may occur on-demand. In this manner, delivery of primary services and management of the devices/services 118 is very elastic, and may be termed "just-in-time" management, based on customer desires. Upon entry of the management scheduling parameters, the cost may be updated (as reflected by "COST-3"), which may be a cost for the management services and scheduling parameters just entered, or a total cost, for example. Customer 170 may proceed by pressing the right arrow softkey, for example.

Figure 4C:

Customer 170 may specify, via portal 107, the desired type of management for devices/services 118. As shown in FIG. 4C, customer 170 may specify, for example, that it wants service provider 103 to both monitor and remediate the previously-selected devices/services 118 (e.g., tablet computers and kiosk 120). A cost to monitor the previously-selected devices/services 118 may be displayed before or after selection of "Monitoring" by customer 170—e.g., represented as "COST-M." Similarly, a cost to remediate the previously-selected devices/services 118 may be displayed before or after selection of "Remediation" by customer 170—e.g., represented as "COST-R." Upon selection of the desired monitoring type(s), the cost may be updated (as reflected by "COST-4"), which may be a cost for the selected monitoring and remediation services, or a total cost, for example. Customer 170 may proceed by pressing the right arrow softkey, for example.

Figure 4D:

Customer 170 may also specify that it wants any problems with devices/services 118 remediated in a specific amount of time, which may be referred to as time constraints for the management services. For example, as shown in FIG. 4D, customer 170 may select that it wants problems remediated within six hours or less. Time parameters associated with the management of devices/services 118 may be manually entered via portal 107 (e.g., as represented by the text box in FIG. 4D), or may be selected from a list of default or pre-determined values chosen by service provider 103. The three time periods shown in FIG. 4D may represent default or pre-determined values chosen by service provider 103. Upon selection of the desired monitoring time constraints, the cost may be updated (as reflected by "COST-5"), which may be a cost for the selected time constraint period of 6-hours, or a total cost for the options chosen up to this point, for example. Customer 170 may proceed by pressing the right arrow softkey, for example.

Each of the options selected thus far may correspond to terms in a (potential) service level agreement between customer 170 and service provider 103. After selecting the various options, customer 170 may be presented with a service level agreement summary page, as reflected in FIG. 4E. The on-demand portal 107 may indicate which version of the SLA the parameters pertain to, and a date/time when the SLA was modified or submitted, since the parameters of the SLA can be changed dynamically by customer 170. Such "versioning" may aid in resolving any potential disputes between service provider 103 and customer 170 regarding the SLA in effect at the time of any device/service issues or events. The SLA summary page may indicate which primary services are to be delivered, which devices are involved, the preliminary schedule for delivery of the primary services, the type(s) of management selected, the preliminary schedule for management, and any other time constraints associated with the management, such as remediation time. Only a single preliminary schedule may be displayed if provision of the primary services and management services correspond to the same preliminary schedule, for example. A schedule may be considered "preliminary" in the sense that it may be changed at-will by the customer 170 after submission of an original request 221, which may or may not have contained a schedule. Request 221 may simply comprise a request to enable or disable services without a corresponding schedule. A total cost may be displayed, as reflected by "COST-6" in FIG. 4E. "COST-6" may be the same as "COST-5" if "COST-5" represented the total cost and customer 170 did not select any additional options in the interim. After reviewing the SLA summary, customer 170 may submit the information, which may be encapsulated within request 221, by pressing the "SUBMIT" softkey. Request 221 may be transmitted to elastic management platform 101 and processed by order management module 202. Service provider 103 may send a confirmation to customer 170 through on-demand portal 107 or through another means of communication.

By means of the on-demand portal 107, customer 170 is given flexibility to dictate when primary services should be received and when primary services or devices should be managed/monitored by the service provider 103. Also, the service provider 103 is given the flexibility to tailor the amount of resources required to support and manage the customer's demands, thereby enabling more efficient use of both the customer's and service provider's resources.

Figure 5:
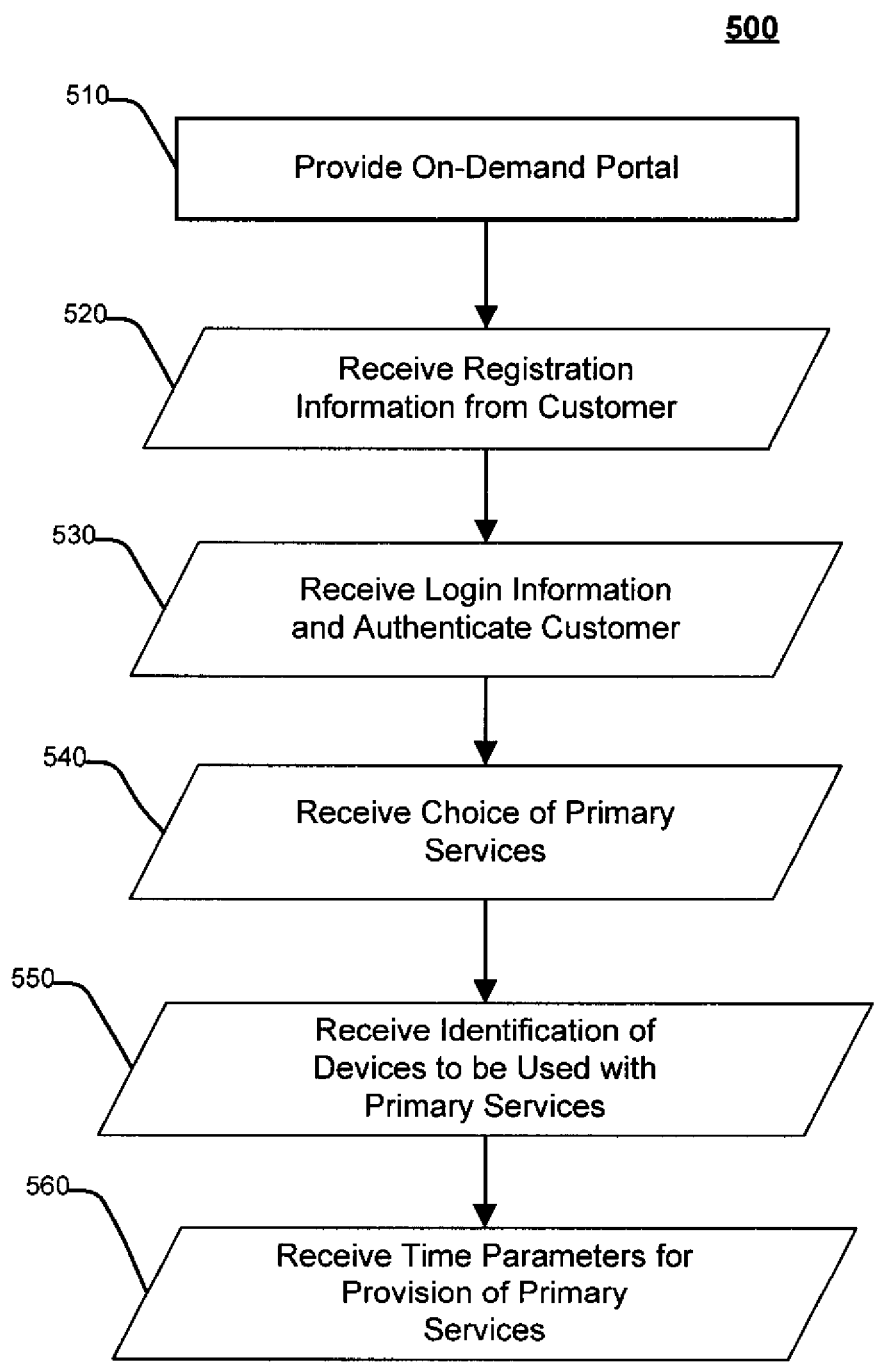
FIG. 5 is an illustrative flowchart of reception of just-in-time selection or modification of primary services, according to an exemplary embodiment of the invention.
Figure 6:
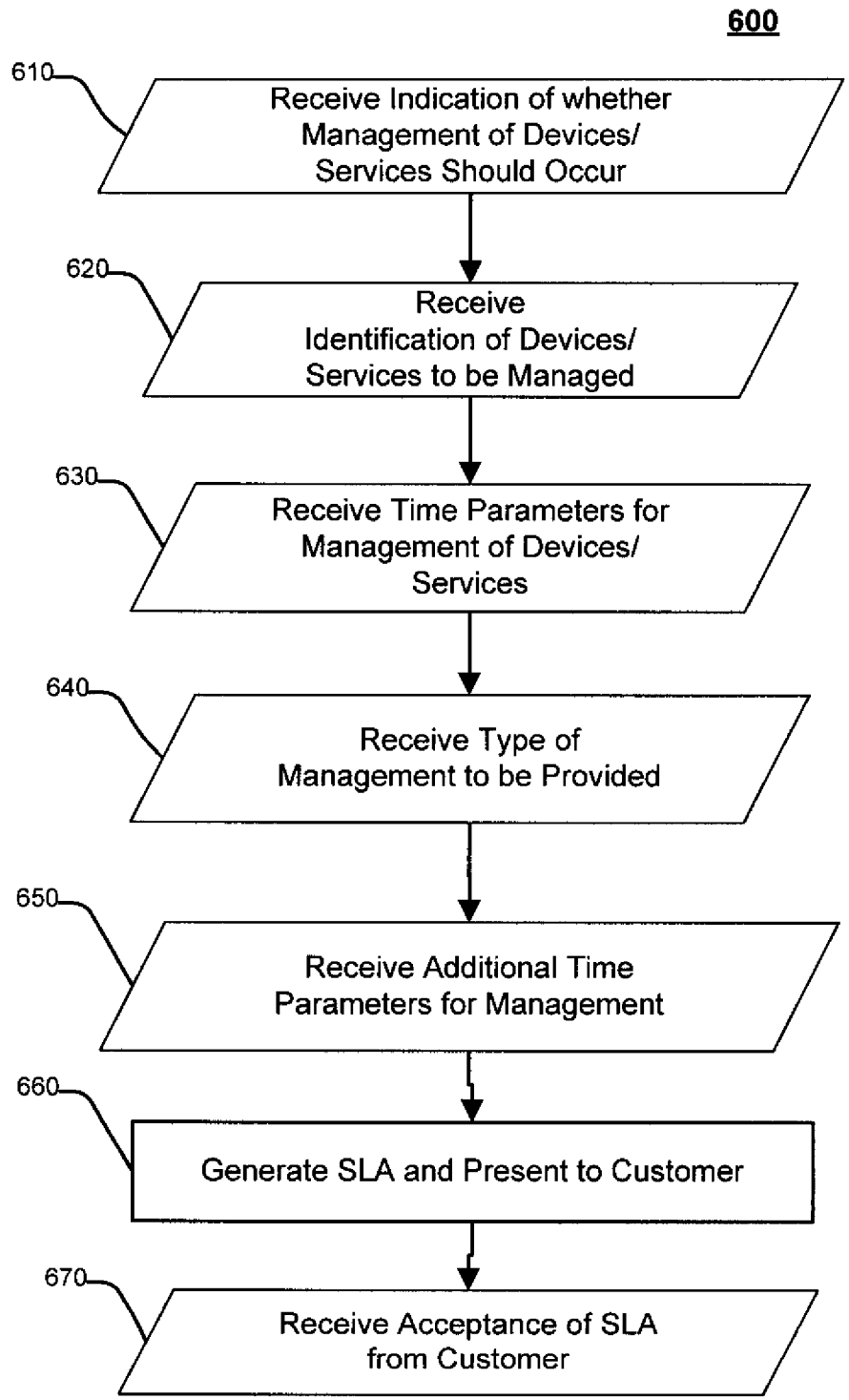
FIG. 6 is an illustrative flowchart of reception of just-in-time selection or modification of monitoring options for devices or services, according to an exemplary embodiment of the invention.

Referring to FIGS. 5-6, illustrative flowcharts of methods for on-demand management of primary services and devices is shown. These exemplary methods 500, 600 are provided by way of example, as there are a variety of ways to carry out methods according to the present disclosure. The methods 500, 600 shown in FIGS. 5-6 can be executed or otherwise performed by one or a combination of various systems and modules. The methods 500, 600 described below may be carried out by system 100 shown in FIG. 1 and the modules shown in FIG. 2, by way of example, and various elements of system 100 and the modules of FIG. 2 are referenced in explaining the exemplary methods of FIGS. 5-6. Each block shown in FIGS. 5-6 represent one or more processes, decisions, methods or subroutines carried out in exemplary methods 500, 600, and these processes, decisions, methods or subroutines are not necessarily carried out in the specific order outlined in FIGS. 5-6, nor is each of them required. Referring to FIG. 5, if customer 170 wishes to purchase primary services from service provider 103, then exemplary method 500 may begin at 510. Alternatively, if customer 170 simply wishes to purchase monitoring services from service provider 103, then several actions in method 500 may be skipped.

At 510, service provider 103 may provide on-demand portal 107 to its customers 170 or to the general public. Order management module 202 may be responsible for outputting the portal 107 to customer 170, and for receiving inputs from customer 170 via portal 107. Inputs from customer 170 may be received in real-time, or upon submission of request 221 by customer 170. On-demand portal 107 may be accessible via network 102, such as via one or more websites on the Internet. On-demand portal 107 may be further accessible using any of devices 110, including devices which customer 170 desires to have monitored.

At 520, a new or current customer 170 of service provider 103 may register to use the elastic management platform 101 using on-demand portal 107. If customer 170 has already registered, then the method may skip to 530. Registration may entail receiving various customer information, including, for example, customer name, contact information (e.g., mailing address, email address, telephone number), financial information (e.g., credit card number), user ID, and/or password. Customer 170 may also provide information on any relevant devices owned or leased by customer 170, through which customer 170 desires to receive primary services or which customer 170 desires to have monitored by service provider 103. For example, customer 170 may provide device IDs, serial numbers, and/or model types or numbers of devices in its inventory. Such information may be manually entered or selected from drop-down lists organized by device type and/or manufacturer, for example. Upon registration, customer 170 may receive an account ID, and the received and/or generated information regarding customer 170 (including devices in the customer's inventory) may be stored in database 105.

At 530, customer 170 may access on-demand portal 107 and login to the portal 107 using, for example, the customer's userID and password. Service provider 103 may receive the customer's userID and password and authenticate the user. Alternatively, customer 170 may access the on-demand portal 107 upon registration, without the need to enter the userID and password immediately after registering. By way of general overview, customer 170 may enter information into portal 107 (e.g., by filling out a form presented within the portal 107) and may select various choices using drop down menus or radio buttons, for example. All such information from customer 170 may comprise request 221, and may pertain to terms of the SLA that will govern provisioning of primary services and/or monitoring services. Ultimately, customer 170 may submit request 221 to the elastic management platform 101 via portal 107, which may be received by order management module 202. Service provider 103 may receive information on the options chosen by customer 170 as customer 170 makes such choices (e.g., in real-time) or after customer 170 submits the request 221 to the elastic management platform 101. Customer 170 may be presented with the cost for the various options chosen by customer 170 immediately upon choosing such options (e.g., in real-time) or after all options have been chosen.

At 540, customer 170 may select which primary services it would like to receive. A list of primary services may be presented to customer 170 for selection, as shown, for example, in FIGS. 3A-3B. Customer 170 may make selections and service provider 103 may receive the customer's choice of primary services. In addition to which type of primary services customer 170 would like to receive, customer 170 may also specify specifics with regard to the degree of primary services, such as upload/download/transmission speeds, types of content, or amount of capacity, for example.

At 550, customer 170 may select which devices are to be used with the primary services chosen at 540. Service provider 103 may provide a list of devices that are available to be used with the chosen primary services and such list may be based on the customer inventory of its devices received during registration. Customer 170 may choose from such list which devices it wishes to use for receipt of the primary services. The devices may already be in the possession of customer 170 (e.g., owned or leased already), or the devices may be available for purchase/lease by customer 170.

At 560, customer 170 may specify, and service provider 103 may receive, preliminary time parameters for provision of the primary services. The time parameters may include the desired preliminary schedule for receipt of primary services, such as the particular days, weeks, months, and/or hours that customer 170 would like to receive the primary services. Unlike conventional delivery of primary services, customer 170 may choose with great elasticity, now and in the future, such as choosing the particular days and/or hours to receive the primary services, or enabling/disabling such services. These time parameters may be very specific and are preferably more precise than default or conventional time periods, such as monthly installments. By means of the on-demand portal 107, selection is very elastic, and may be termed "just-in-time" management of primary services, based on customer desires.

Customer 170 may choose to have service provider 103 manage the primary services and/or devices, which may be separate from method 500 or a continuation of method 500. For example, service provider 103 may not provide the "primary services" with regard to devices that customer 170 wishes to have managed. Alternatively, there may not be any related primary services at all, and customer 170 may wish to have particular devices managed/monitored by service provider 103. Or, customer 170 may already be receiving primary services from service provider 103. In either case, referring to FIG. 6, exemplary method 600 may begin at 610.

As mentioned above, customer 170 may desire to have service provider 103 manage particular devices or primary services during a specific period of time to ensure that the devices are functional and that the primary services are appropriately being delivered during that time. Accordingly, after logging in to on-demand portal 107, customer 170 may navigate to a "Monitoring" or management portion of portal 107. At 610, service provider 103 may receive an indication from customer 170, via on-demand portal 107, that customer 170 desires service provider 103 to manage its devices/services 118.

After receiving an indication that customer 170 desires to have service provider 103 monitor particular devices and/or services, customer 170 may be directed to a page where customer 170 may select which particular devices or services should be monitored. For example, as shown in FIG. 4A, various devices and services may be presented to customer 170 for selection. At 620, service provider 103 may receive identification from customer 170, via portal 107, of which devices/services 118 are to be managed.

Customer 170 may also specify, via portal 107, time parameters associated with the management/monitoring. Time parameters may comprise the times during which customer 170 wants service provider 103 to manage the device/service 118, and/or time constraints for such management. At 630, service provider 103 may receive time parameters from customer 170, via portal 107, for management of devices/services 118. Customer 170 may also enable/disable monitoring services, or modify time parameters for such monitoring, at-will, using on-demand portal 107. In this manner, management of the devices/services 118 is very elastic, and may be termed "just-in-time" management, based on customer desires.

Customer 170 may specify, via portal 107, the desired type of management for devices/services 118. For example, customer 170 may specify that it wants service provider 103 to monitor and/or remediate the previously-selected devices/services 118. At 640, service provider 103 may receive the desired type of management to be provided.

Customer 170 may also specify that it wants any problems with devices/services 118 remediated in a specific amount of time, which may be referred to as time constraints for the management services. At 650, service provider 103 may receive additional time parameters, such as time constraints for remediation, from customer 170, via portal 107, for management of devices/services 118.

Each of the options selected thus far may correspond to terms in a (potential) service level agreement between customer 170 and service provider 103. At 660, after customer 170 has selected the various options, service provider 103 may generate the service level agreement (SLA) based on the options chosen by customer 170, and the SLA may be presented to customer 170 in summary form with an option to view all the terms and conditions associated with the SLA. The SLA summary page may indicate which primary services are to be delivered, which devices are involved, the preliminary schedule for delivery of the primary services, the type(s) of management selected, the preliminary schedule for management, and any other time constraints associated with the management, such as remediation time.

At 670, service provider 103 may receive submission of request 221 from customer 170, which may be deemed an acceptance of the SLA by customer 170. Request 221 may be processed by order management module 202 so that service provider 103 may precisely schedule provision of primary services and/or management of devices/services 118 according to the time parameters in the SLA. Service provider 103 may also send a confirmation to customer 170 through online portal 107 or through another means of communication.

Figure 4E:

Monitoring module 203 may begin monitoring the devices/services 118 as dictated by the time parameters in the SLA. Any problems detected by monitoring module 203 may be transmitted to trouble management module 205, and a trouble ticket and/or service ticket may be generated, as discussed above. Also as explained above, financial management module 206 may display a cost for provisioning of the various primary services and/or monitoring services, as customer 170 makes selections in portal 107 (e.g., in real-time), or upon generation of the SLA, such as shown in FIG. 4E.

If customer 170 wishes to change parameters of the SLA (e.g., enable/disable services, or change scheduling options or types of monitoring, for example), customer 170 may do so at-will through on-demand portal 107. Financial management module 206 may output an updated cost to customer 170 as terms of the SLA are modified. After selection of the various options by customer 170, a modified SLA may be generated and presented to customer 170. The modified SLA may be accepted and submitted to the elastic management platform 101 as part of request 221. The changes may then be processed by order management module 202, and output to other modules of elastic management platform 101, such as the monitoring module 203. Service provider 103 may then adjust the amount and/or type of resources dedicated to providing the primary services and/or monitoring services to customer 170. In this manner, management of the devices/services 118 may remain very elastic based on customer desires, and service provider resources may remain precisely tuned to customer demands.

Many embodiments and adaptations other than those herein described, as well as many variations, modifications and equivalent arrangements, will be apparent from or reasonably suggested by the foregoing description.

While the foregoing illustrates and describes exemplary embodiments of this invention, it is to be understood that the invention is not limited to the construction disclosed herein.

What is claimed is:

1. A method comprising:
   providing, by one or more devices of a service provider, an on-demand portal;
   receiving, by the one or more devices and via the on-demand portal, a request for monitoring services,
      the request including an identification of at least one of a device or a primary service to be monitored,
      the request further including a type of monitoring to be provided,
      the monitoring services being enabled or disabled at-will, and
      the request including a request for remediation of the at least one of the device or the primary service,
         the remediation being based on a utilization level of the at least one of the device or the primary service,
            the utilization level being determined at-will;
   receiving, by the one or more devices and via the on-demand portal, an instruction to enable the monitoring services of the service provider on a just-in-time basis;
   identifying, by the one or more devices and via the on-demand portal, a pattern associated with previous requests; and
   sending a prompt for enabling, by the one or more devices and via the on-demand portal, the monitoring services of the service provider before an anticipated time identified in the pattern.

2. The method of claim 1, wherein the request includes the identification of the primary service to be monitored, and
   wherein the request further comprises a request for provisioning the primary service, the primary service including at least one of:
      communication,
      data,
      Internet connectivity,
      media,
      broadcast,
      cloud computing,
      contact center,
      unified communications and collaborations (audio/video),
      security,
      fraud detection and management,
      tracking,
      usage reporting,
      troubleshooting,
      upgrade,
      repair, or
      warranty services.

3. The method of claim 2, further comprising:
   receiving, via the on-demand portal, at least one of:
      a time when the primary service is to be enabled, or
      a characteristic of the primary service to be enabled.

4. The method of claim 1, wherein the request includes the identification of the device to be monitored, and
   wherein the device to be monitored includes at least one network device.

5. The method of claim 1, wherein the request includes the identification of the device to be monitored, and
   wherein the request further comprises a request for remediation services for the device.

6. The method of claim 5, wherein the request further comprises time constraints for the remediation services.

7. The method of claim 1, wherein parameters of the request are encapsulated in service level agreement terms, and
   wherein the method further comprises:
      dynamically adjusting the service level agreement terms based on receiving a service level agreement to the service provider.

8. The method of claim 1, wherein the request includes the identification of the device to be monitored, and
   wherein the monitoring services comprise tracking a location of the device to be monitored.

9. The method of claim 1, wherein the request includes the identification of the device to be monitored, and
   wherein the device is pre-provisioned for management by the service provider.

10. The method of claim 1, wherein a management client is installed on the device to enable the service provider to monitor the device.

11. A system comprising:
    a memory to store instructions; and
    a processor to execute the instructions to:
       provide an on-demand portal;
       receive a request for monitoring services via the on-demand portal,
          the request including an identification of at least one of a device or a primary service to be monitored by a service provider,
          the request further including a type of monitoring to be provided by the service provider,
          the monitoring services being enabled or disabled at-will, and
          the request including a request for remediation of the at least one of the device or the primary service,
             the remediation being based on a utilization level of the at least one of the device or the primary service,
                the utilization level being determined at-will;

receive, via the on-demand portal, an instruction to enable the monitoring services of the service provider on a just-in-time basis;
identify, via the on-demand portal, a pattern associated with previous requests; and
send a prompt to enable, via the on-demand portal, the monitoring services of the service provider before an anticipated time identified in the pattern.

12. The system of claim 11, wherein the request includes the identification of the primary service to be monitored, and wherein the request further comprises a request for provisioning the primary service,
the primary service including at least one of:
communication,
data,
Internet connectivity,
media,
broadcast,
cloud computing,
contact center,
unified communications and collaborations (audio/video),
security,
fraud detection and management,
tracking,
usage reporting,
troubleshooting,
upgrade,
repair, or
warranty services.

13. The system of claim 12, the processor further to:
receive, via the on-demand portal, at least one of:
a time when the primary service should is to be enabled, or
a characteristic of the primary service to be enabled.

14. The system of claim 11, wherein the request includes the identification of the device to be monitored, and
wherein the device to be monitored includes at least one network device.

15. The system of claim 11, wherein the request includes the identification of the device to be monitored, and
wherein the request further comprises a request for remediation services for the device.

16. The system of claim 15, wherein the request further comprises time constraints for the remediation services.

17. The system of claim 11, wherein parameters of the request are encapsulated in service level agreement terms, and
wherein the processor is further to:
dynamically adjust the service level agreement terms based on receiving a service level agreement.

18. The system of claim 11, wherein the request includes the identification of the device to be monitored, and
wherein the monitoring services comprise tracking a location of the device to be monitored.

19. A non-transitory computer-readable medium storing instructions, the instructions comprising:
one or more instructions that, when executed by a processor, cause the processor to:
receive a request for monitoring services via an on-demand portal,
the request including an identification of at least one of a device or a primary service to be monitored by a service provider,
the request further including a type of monitoring to be provided by the service provider,
the monitoring services being enabled or disabled at-will, and
the request including a request for remediation of the at least one of the device or the primary service,
the remediation being based on a utilization level of the at least one of the device or the primary service,
the utilization level being determined at-will;
receive, via the on-demand portal, an instruction to enable the monitoring services of the service provider on a just-in-time basis;
identify, via the on-demand portal, a pattern associated with previous requests; and
send a prompt enable, via the on-demand portal, the monitoring services of the service provider before an anticipated time identified in the pattern.

20. The non-transitory computer-readable medium of claim 19, wherein the one or more instructions further cause the processor to:
receive, via the on-demand portal, at least one of:
a time when the primary service is to be enabled, or
a characteristic of the primary service to be enabled.

* * * * *